C. SCHMANDT.
Boiler-Tube Cleaner.
No. 6,482. Reissued June 8, 1875.
—FIG. I— —FIG. II— —FIG. III— —FIG. V—
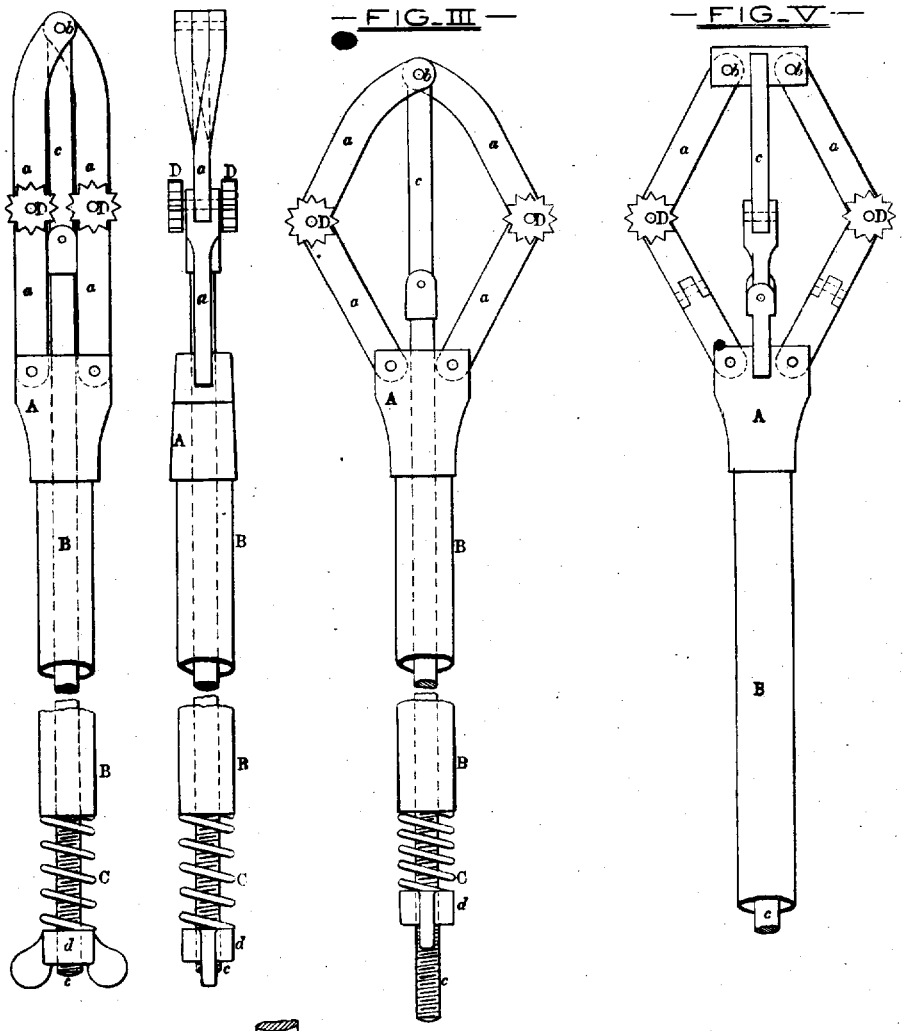
—FIG. IV—
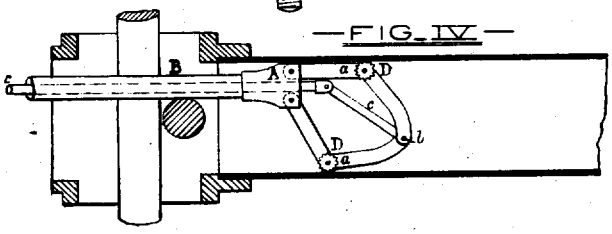
—WITNESSES.—
Wm. H. Dawson
W. W. Wharton
—INVENTOR.—
Charles Schmandt,
by G. H. & T. J. Howard
attys.
THE GRAPHIC CO. PHOTO-LITH. 39 & 41 PARK PLACE, N.Y.

UNITED STATES PATENT OFFICE.

CHARLES SCHMANDT, OF BALTIMORE, MARYLAND, ASSIGNOR OF ONE-HALF INTEREST TO CHARLES MITTENDORFF, OF SAME PLACE.

IMPROVEMENT IN BOILER-TUBE CLEANERS.

Specification forming part of Letters Patent No. 161,558, dated March 30, 1875; reissue No. 6,482, dated June 8, 1875; application filed April 28, 1875.

*To all whom it may concern:*

Be it known that I, CHARLES SCHMANDT, of the city of Baltimore and State of Maryland, have invented certain new and useful Improvements in Devices for Cleansing the Surfaces of Tubes, &c., of which the following is a specification; and I do hereby declare that in the same is contained a full, clear, and exact description of my said invention, reference being had to the accompanying drawing, and to the letters of reference marked thereon.

My invention relates to a device, hereinafter fully described, adapted to be used in the removal of scale or other deposit from the surfaces of tubes, flues, and the like, and is specially designed for the cleansing of the inner surface of the tubes of sectional boilers, or those in which the water in the boiler comes into contact with the inner surface of the tubes, the outer surface of the same being acted upon by the fire.

In the description of my invention which follows due reference must be had to the accompanying drawing forming a part of this specification, and in which—

Figure 1 is a side view of the device, closed or contracted in width to allow of its introduction to a boiler-tube. Fig. 2 is an edge view of the same. Fig. 3 is a side view of the invention extended as when used in the operation of cleaning the inner surface of a boiler-tube. Fig. 4 is a sectional view of a part of a tube of a sectional boiler, showing the manner in which the entrance to the same is usually obstructed by bolts, and the position occupied by the several parts of the device when in use. Fig. 5 is a view of the invention modified in the construction of its parts.

Similar letters of reference indicate similar parts in all the figures.

A is a block or head to which are pivoted the arms *a* jointed nearly centrally of their length and connected at their outer ends by the pin *b*. The pin *b* also serves to connect the rod *c* to the ends of the arms *a* and to furnish means by which a conjoined movement of the said rod and arms is effected. In Figs. 1, 2, 3, and 4 the rod *c* is shown as jointed to admit of its occupying the position shown in Fig. 4. B is a pipe screwed into the block A and of such internal diameter as will admit of the rod *c* passing loosely through its entire length. C is a spiral spring adapted to occupy a limited portion of the rod *c* between the end of the pipe B and a thumb-nut, *d*, screwed upon the rod near to the end thereof. The spiral spring is designed to answer the purpose of a flexible washer to prevent rigidity of the arms, under circumstances hereinafter described. D D are circular toothed or roughened wheels adapted to rotate upon the pins in the joints of the arms *a*.

The following is a description of the manner in which my invention is used in the operation of scaling a tube, the entrance to which is obstructed by bolts, as is shown in the drawing, Fig. 4. The thumb-nut *d* is first unscrewed from contact with the spiral spring, and the device closed, as shown in Figs. 1 and 3, when it can be easily inserted in the tube. The arms are then extended by means of the thumb-nut *d*, which is screwed into contact with the spiral spring, the wheels D being thereby forced closely to the scale in the tube. Upon the necessary tension being obtained the device is drawn backward and forward in the tube, the cutters removing a portion of the scale in a longitudinal direction equal to the width across the faces of the wheels. The device is then turned and another portion of the scale removed, the operation being continued until the wheels have traversed the entire inner circumference of the tube. The resiliency of the spiral spring allows the device to adapt itself to any variation in size of the tube, and prevents the placing of an undue strain upon any of its parts. The device can be constructed with any number of arms and sets of wheels, and with a rigid rod or with joints in the arms and rod, as shown in Fig. 5, as the combination of arms, joints, and wheels has to be changed to suit the peculiar formation of the tubes and the arrangement of the boiler, and to suit the outside as well as the inside of the tubes.

Having thus described my invention, what I claim as new, and desire to secure by Letters Patent of the United States, is—

1. The combination of the wheels D with the jointed arms of a tube or flue cleaner, substantially as and for the purpose specified.

2. The jointed arms *a* pivoted to the block A, and provided with the revoluble wheels D, in combination with the rods *c*, substantially as set forth.

3. The combination of the block A, jointed arms *a*, cutters D, rod *c*, pipe B, spiral spring C, and thumb-nut *d*, substantially as and for the purposes specified.

In testimony whereof, I hereunto subscribe my name this 23d day of April, in the year of our Lord 1875.

CHARLES SCHMANDT.

Witnesses:
WM. T. HOWARD,
THOS. MURDOCH.